US009374233B2

(12) United States Patent
Narayanan

(10) Patent No.: US 9,374,233 B2
(45) Date of Patent: Jun. 21, 2016

(54) INTEGRATED CONFERENCE FLOOR CONTROL

(71) Applicant: Avaya Inc., Basking Ridge, NJ (US)

(72) Inventor: Srinivasan Narayanan, Pune (IN)

(73) Assignee: Avaya Inc., Basking Ridge, NJ (US)

( * ) Notice: Subject to any disclaimer, the term of this patent is extended or adjusted under 35 U.S.C. 154(b) by 273 days.

(21) Appl. No.: 13/628,842

(22) Filed: Sep. 27, 2012

(65) Prior Publication Data

US 2014/0085406 A1   Mar. 27, 2014

(51) Int. Cl.
| | |
|---|---|
| *H04N 7/14* | (2006.01) |
| *H04L 12/18* | (2006.01) |
| *H04N 7/15* | (2006.01) |
| *H04L 29/06* | (2006.01) |

(52) U.S. Cl.
CPC ........ *H04L 12/1827* (2013.01); *H04L 65/4038* (2013.01); *H04L 65/4046* (2013.01); *H04N 7/152* (2013.01); *H04N 7/157* (2013.01); *H04L 12/1822* (2013.01)

(58) Field of Classification Search
USPC .............. 348/14.08–14.09; 709/204; 715/753
See application file for complete search history.

(56) References Cited

U.S. PATENT DOCUMENTS

| | | | |
|---|---|---|---|
| 5,999,208 A | 12/1999 | McNerney et al. | |
| 7,036,082 B1 | 4/2006 | Dalrymple et al. | |
| 2005/0108328 A1* | 5/2005 | Berkeland | H04L 12/1822 709/204 |
| 2006/0233120 A1* | 10/2006 | Eshel | H04L 12/1822 370/260 |
| 2010/0225736 A1* | 9/2010 | King et al. | 348/14.09 |
| 2011/0283203 A1* | 11/2011 | Periyannan | H04N 7/141 715/753 |
| 2012/0162355 A1* | 6/2012 | Cheng | H04L 12/1827 348/14.08 |
| 2013/0215116 A1* | 8/2013 | Siddique et al. | 345/420 |
| 2013/0339781 A1* | 12/2013 | Wamorkar et al. | 714/4.2 |
| 2014/0052463 A1* | 2/2014 | Cashman et al. | 705/2 |
| 2014/0181208 A1* | 6/2014 | Robinson et al. | 709/204 |

* cited by examiner

*Primary Examiner* — Maria El-Zoobi
(74) *Attorney, Agent, or Firm* — Sheridan Ross P.C.

(57) ABSTRACT

Methods and systems for providing a composite conference environment are disclosed. More particularly, a virtual reality environment (VRE) that can accommodate the inclusion of a conventional multipoint conference as a registered user or individual participants in a conventional multipoint conference as registered users within a composite conference environment hosted by the VRE is provided. Accordingly, a conference that is spread across multiple servers, namely a virtual reality server and a conventional multipoint conference server, can be created and moderated. Moreover, audio/video streams, features, and control can be provided to all users participating in the composite conference environment.

20 Claims, 8 Drawing Sheets

500

MCU1  VRMR1
  Lawrence    Josh
  Kateri    Heinz
  LaMarcus    Serina
  Pankaj    MCU1
  Rebecca
  Michael Audio Controls
  Mute All
  Unmute All
  Operator
  Listen Only
  Record
  Change Volume
  Dial Out
  Disconnect
  Promote to Admin

FIG. 5

INTEGRATED CONFERENCE FLOOR CONTROL

FIELD

Methods and systems for providing integrated conference floor control are described. More particularly, methods and systems that integrate users registered with a virtual reality environment module and users registered with a multipoint control unit conference module within a common or shared virtual reality environment are provided.

BACKGROUND

Meetings can be a very important part of doing business. With good planning, participation, and follow-up, meetings can help move a project or decision forward or bring people to consensus. One of the benefits to having people in one place is the ability to read body language. Various types of media attempt to address this when face to face meetings aren't possible. For example, enterprises can use videoconferencing to simulate face to face communications, without losing all of the possible non-verbal clues. Virtual reality environments are evolving to be able to mimic natural movement and non-verbal physical clues and sentiment. In today's multi-modal enterprise, a variety of meeting types are used for effective communication. In each type of meeting, the most successful participation will come from people who are actively engaged in the meeting.

In a conventional multipoint conference, participants register with a conference server or multipoint control unit conference system. The participants in the multipoint conference can share audio and/or video information, according to the capabilities of the registered endpoints, and the conference server or module. As an alternative to traditional multipoint control unit conferences, virtual reality conferences have been developed. In a virtual reality conference, participants interact within a virtual reality environment. More particularly, participants can be represented as avatars in a virtual meeting space. The meeting space can also present information, such as documents, slides, whiteboards, or other information. Various controls can be provided that enable a conference participant or moderator to moderate a conference. However, systems that integrate multiple conferences spread across a traditional multipoint control unit conference server and a virtual reality server, and that allow a single moderator to control an integrated conference, have not been available.

SUMMARY

Methods and systems for providing integrated conference floor control are disclosed. More particularly, a virtual reality (VR) server is provided that is capable of registering users, and of presenting a virtual reality environment (VRE) to registered users. In addition, a multipoint control unit (MCU) conference server that includes an MCU conference module capable of registering users and conferencing them together is provided. In accordance with embodiments of the present disclosure, the VRE module can, in addition to registering users directly, register users through the MCU conference server, thereby creating a composite conference environment. Users registered through an MCU conference server can be depicted within the VRE provided by the VRE module as a single avatar representing multiple users, or as individual avatars.

Methods in accordance with embodiments of the present disclosure include registering one or more users with a VRE module. In addition, one or more users are registered with an MCU conference module. In response to a request to join a conference established through the VRE module with the conference established through the MCU conference module, at runtime the MCU conference module is registered as a user included in the VR conference established by the VRE module. The users registered with the MCU conference module are registered through the VR conference when the MCU conference module is registered. The VRE module creates avatars for the registered users. Moreover, where the users joining the VR conference through the MCU conference module are represented in a roster of users provided to the VRE module, each of those users may be represented by an individual avatar. Alternatively, the users joining the composite conference through the MCU conference module can be represented by a single avatar. Audio/video data can be passed to users represented by avatars participating in the composite conference environment according to the status and/or position of the respective avatars within the VRE hosting the composite conference environment.

Additional features and advantages of embodiments of the present invention will become more readily apparent from the following description, particularly when taken together with the accompanying drawings.

BRIEF DESCRIPTION OF THE DRAWINGS

FIG. 5 depicts an integrated conference user interface in accordance with embodiments of the present disclosure.

DETAILED DESCRIPTION

Figure 1:
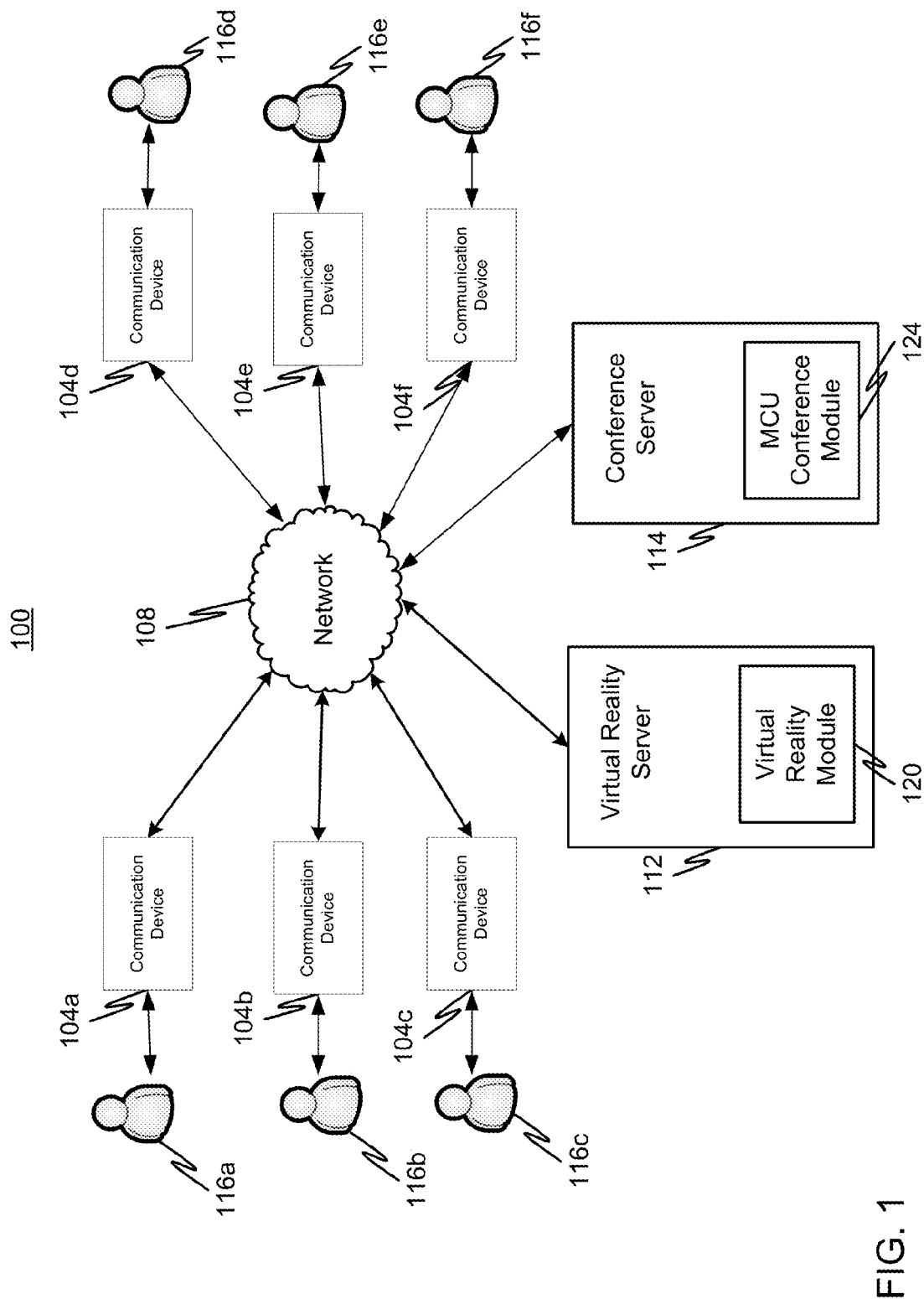
FIG. 1 is a block diagram depicting components of a system in accordance with embodiments of the present disclosure.

FIG. 1 is a block diagram depicting components of a communication system 100 in accordance with embodiments of the present disclosure. In general, the system 100 includes a plurality of communication devices 104 interconnected by one or more networks 108 to a virtual reality (VR) server 112 and a plurality of communication devices 104 interconnected by one or more networks 108 to a conference server 114. In general, the virtual reality server 112 operates to present a virtual reality environment (VRE) to at least some of the users 116 associated with the communication devices 104, while the conference server 114 operates to provide a conventional conferencing facility to at least some of the users 116 associated with the communication devices 104.

Each communication device 104 generally supports communications with one or more other communication devices 104, either directly or through one of the servers 112 or 114. More particularly, at least some of the communication devices 104 participate in a VRE provided by a VRE module 120 running on the VR server 112 through a registration of such communication devices 104 with the VRE module 120, and to other communication devices 104 that are connected to the VRE module 120 through a registration with a multipoint control unit (MCU) conference module 124 running on the conference server 114. More particularly, the MCU conference module 124 registers with the VRE module 120, and the MCU conference module 124 extends the VRE provided by the VRE module 120 to those communication devices 104 registered with the MCU conference module 124. In an exemplary embodiment, a communication endpoint 104 is capable of providing visual information depicting a virtual reality environment to a user 116. Accordingly, examples of communication devices 104 include desktop computers, laptop computers, tablet computers, thin client devices, smart phones, and the like.

The communication network 108 may be any type of network that supports communications using any of a variety of protocols. For example, but without limitation, a network 108 may be a local area network (LAN), such as an Ethernet network, a wide area network (WAN), a virtual network such as but not limited to a virtual private network (VPN), the Internet, an intranet, an extranet, a public switched telephone network (PSTN), a wireless network such as but not limited to a cellular telephony network or a network operating under any one of the IEEE 802.11 suite of protocols, the Bluetooth protocol or any other wireless or wireline protocol. Moreover, the network 108 can include a number of networks of different types and/or utilizing different protocols. Accordingly, the network 108 can be any network or system operable to allow communications or exchanges of data between communication devices 104 directly, via the virtual reality server 112, the conference server 114, and/or a communication or other server or network node.

The VRE module 120 running on the virtual reality server 112 generally operates to provide a virtual reality environment to registered communication devices 104, such that users 116 of the communication devices 104 can interact through the virtual reality environment. Moreover, the virtual reality server 112 disclosed herein can operate to provide a virtual reality environment to communication devices 104 that are registered with the MCU conference module 124, where the MCU conference module 124 is in turn registered with the VRE module 120. In general, the virtual reality module 120 operates to present the virtual reality environment to users 116 through communication devices 104 participating in a virtual reality environment. Moreover, the virtual reality environment is controlled by the virtual reality module 120 with respect to each communication device 104 participating in a virtual reality session. Through a connection between the VRE module 120 on the VR server 112 and the communication device 104, shared virtual reality information is presented to all users 116 participating in the virtual reality session. In addition, the VRE module 120 can selectively present individual users 116 with information according to the viewpoint of an associated avatar in the virtual reality environment, or other controls. The MCU conference module 124 generally operates to interconnect registered communication devices 104 with one another, to provide a multipoint conference facility. For example, audio/video streams can be exchanged between the participants of a conference established through the MCU conference module 124. Although the MCU conference module 124 can present both audio and video information to participating users 116 through associated communication devices 104, the MCU conference module 124 does not itself provide a virtual reality environment in which users 116 are depicted as avatars, and in which interactions between users 116 can be controlled, at least in part, through manipulation of the avatars. Instead, as described herein, a virtual reality environment can be extended to users registered with the MCU conference module 124 through registration of the MCU conference module 124 or of communication devices 104 that are first registered with the MCU conference module 124 with the VRE module 120.

Figure 2A:
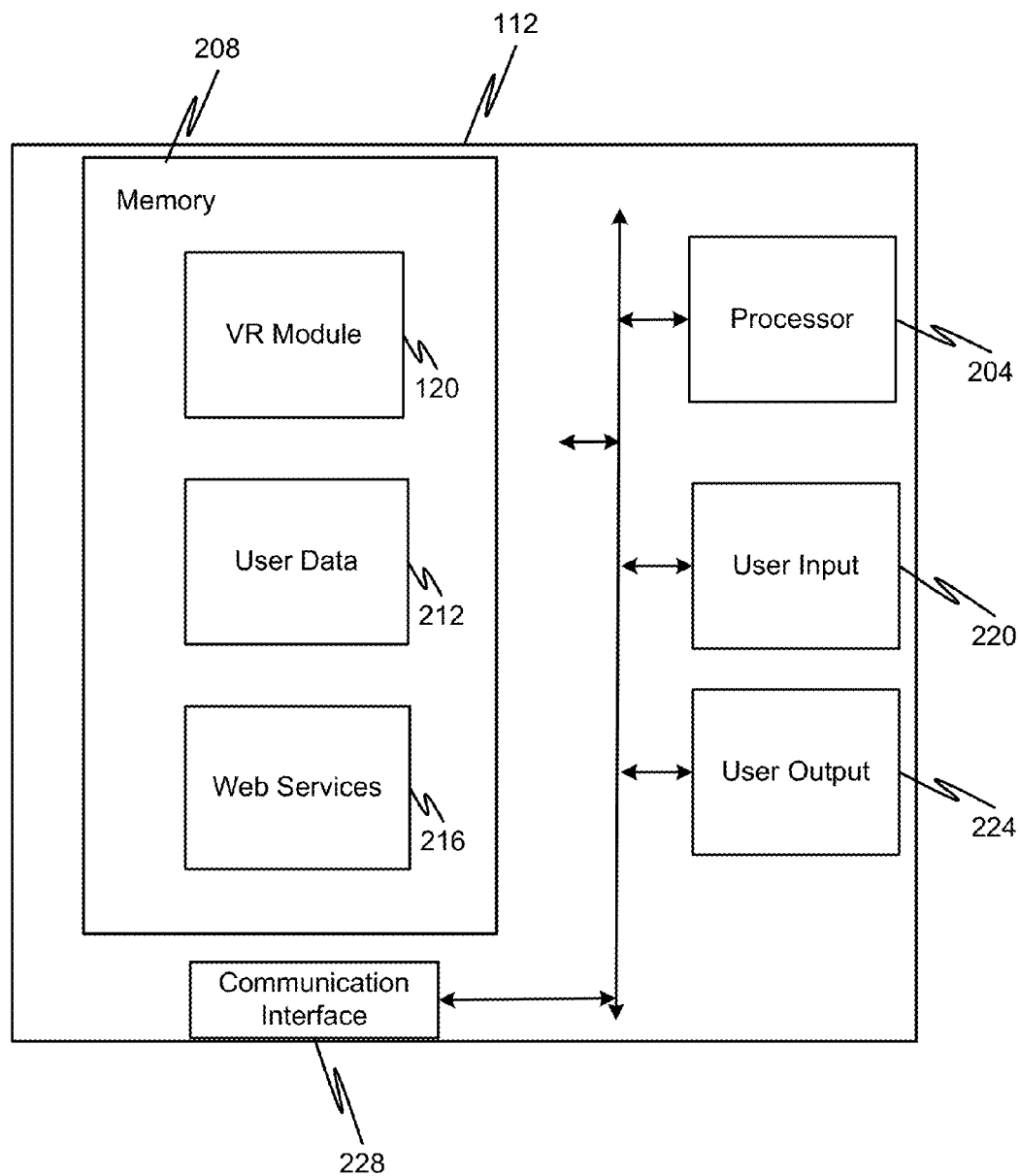
FIG. 2A is a block diagram depicting components of a virtual reality server in accordance with embodiments of the present disclosure.
Figure 2B:
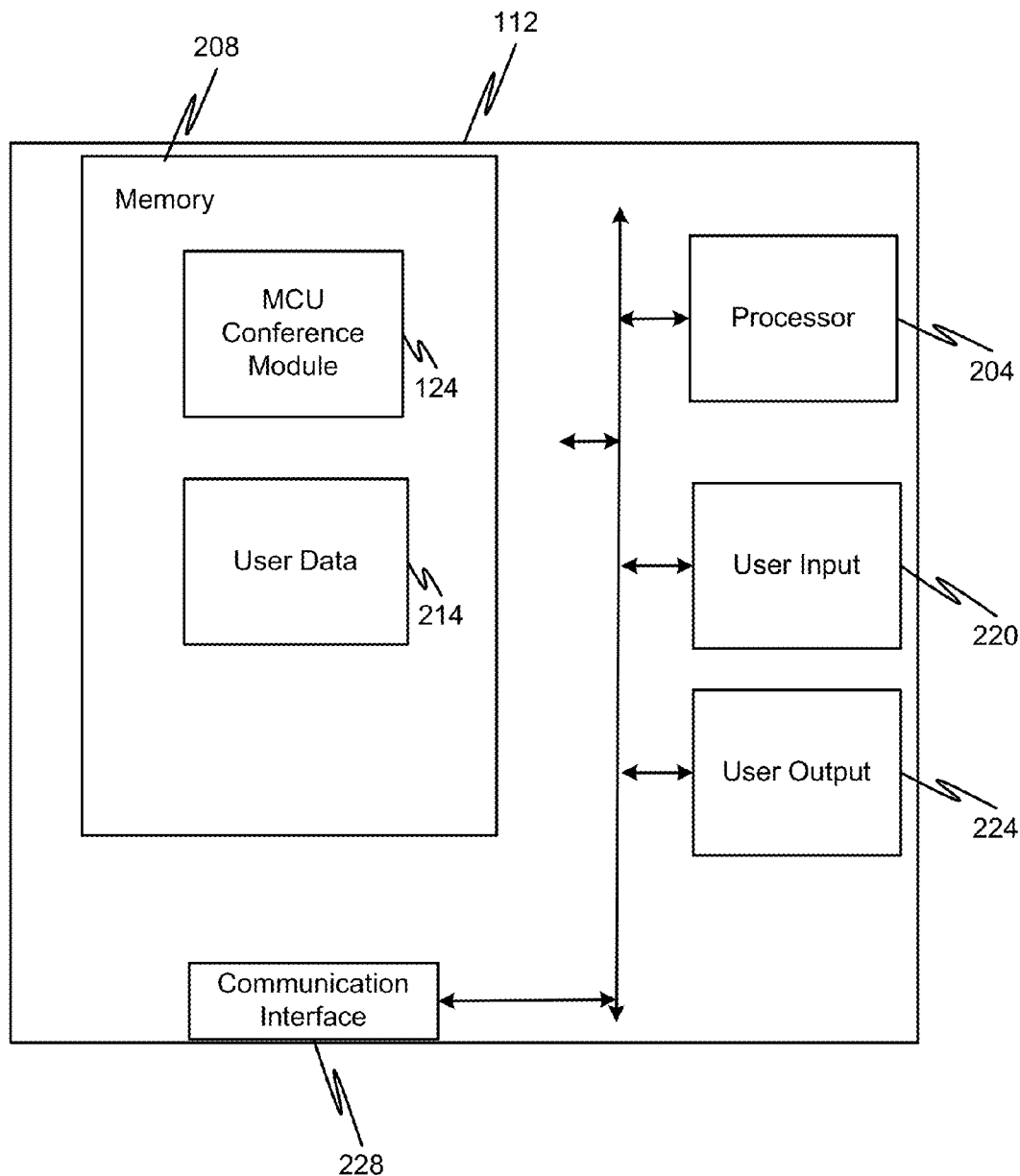
FIG. 2B is a block diagram depicting components of a multipoint conference unit server in accordance with embodiments of the present disclosure.
Figure 2C:
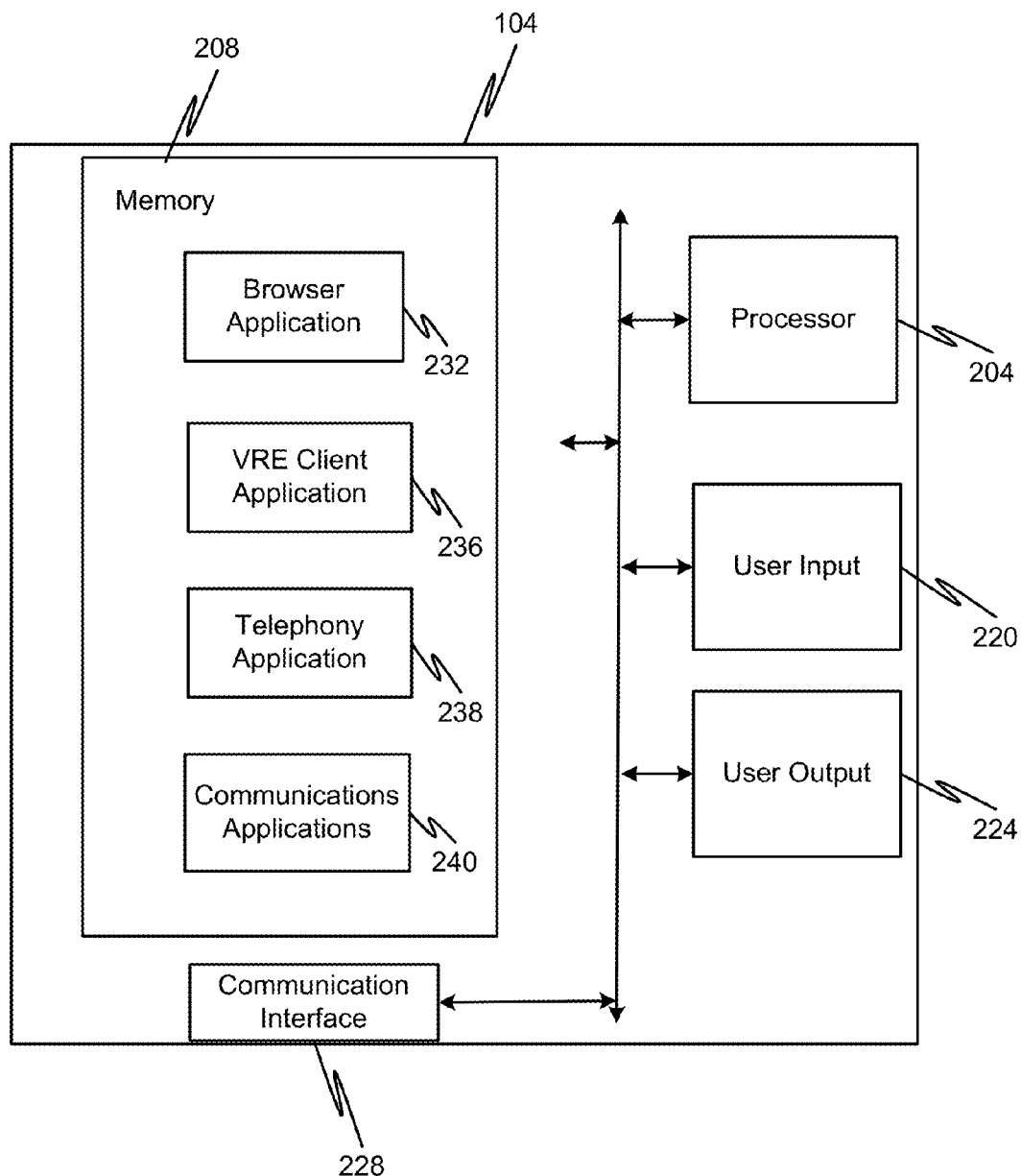
FIG. 2C is a block diagram depicting components of a communication device in accordance with embodiments of the present disclosure.

FIGS. 2A, 2B and 2C are block diagrams depicting components of a virtual reality server 112, a conference server 114, and a communication device 104 respectively in accordance with embodiments of the present disclosure. The virtual reality server 112, the conference server 114, and the communication device 104 each can include a processor 204 capable of executing program instructions. The processor 204 can include any general purpose programmable processor or controller for executing application programming. Alternatively, the processor 204 may comprise a specially configured application specific integrated circuit (ASIC). The processor 204 generally functions to run programming code implementing various functions performed by the associated server or device. For example, the processor 204 of the VR server 112 can implement functions performed in connection with the presentation of a virtual reality environment to users 116 of communication devices 104 through execution of the virtual reality environment module 120. The processor 204 of the conference server 114 can implement functions performed in connection with the provision of conference facilities to users 116 of communication devices through execution of the MCU conference module 124. The processor of a communication device 104 can operate to present audio/video information to a user 116 through execution of a browser application 232, a VRE client application 236, or a telephony application, including but not limited to a video telephony application 238.

The virtual reality server 112, the conference server 114, and the communication device 104 additionally include memory 208. The memory 208 can be used in connection with the execution of programming by the processor 204, and for the temporary or long term storage of data and/or program instructions. For example, the virtual reality server 112 memory 208 can include an application implementing the virtual reality environment module 120, stored user data 212, and a web services module 216 that can operate in connection with the VR module 120 to present shared and personal information to communication devices 104 participating in a VRE. The conference server 114 can include an application implementing the MCU conference module 124, and user data 214. The memory 208 of a communication device 104 can include a browser application 232, a VRE client application 236, a telephony application 238, and various communication applications 240. The memory of a server 112, 114 or device 104 can include solid state memory that is resident, removable and/or remote in nature, such as DRAM and SDRAM. Moreover, the memory 208 can include a plurality of discrete components of different types and/or a plurality of logical partitions. In accordance with still other embodiments, the memory 208 comprises a non-transitory computer readable storage medium. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read.

The VR server 112, conference server 114, and a communication device 104 can also include or be associated with user input devices 220 and user output devices 224. Such devices 220 and 224 can be used in connection with the provisioning and operation of a VRE, a conventional multipoint conference, and/or to allow users to control operations of the VRE, conventional conference, and/or the display of and interaction with VRE and/or conference information. Examples of user input devices 220 include a keyboard, a numeric keypad, a touch screen, a microphone, scanner, and pointing device combined with a screen or other position encoder. Examples of user output devices 224 include a display, a touch screen display, a speaker, and a printer. The VR server 112, conference server 114, and a communication device 104 also generally include a communication interface 228 to interconnect the associated server 112 or device 104 to a network 108.

Figure 3:
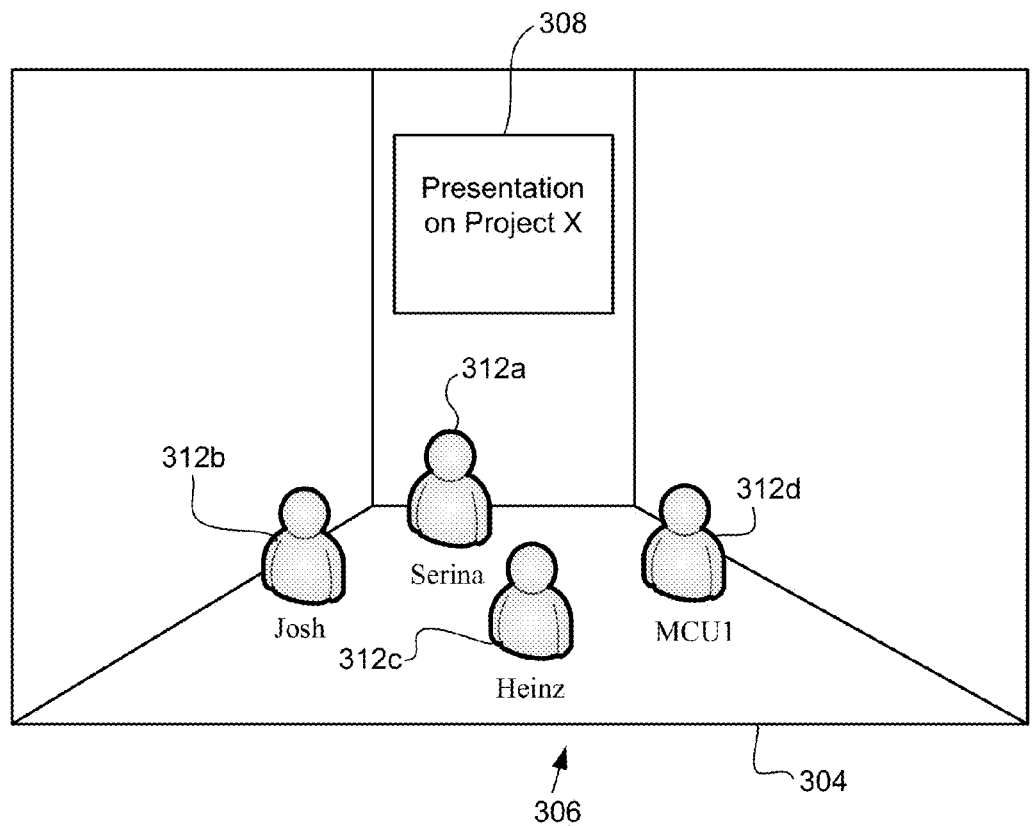
FIG. 3 depicts an integrated conference where an MCU conference is presented as one avatar in accordance with embodiments of the present disclosure.
Figure 4:
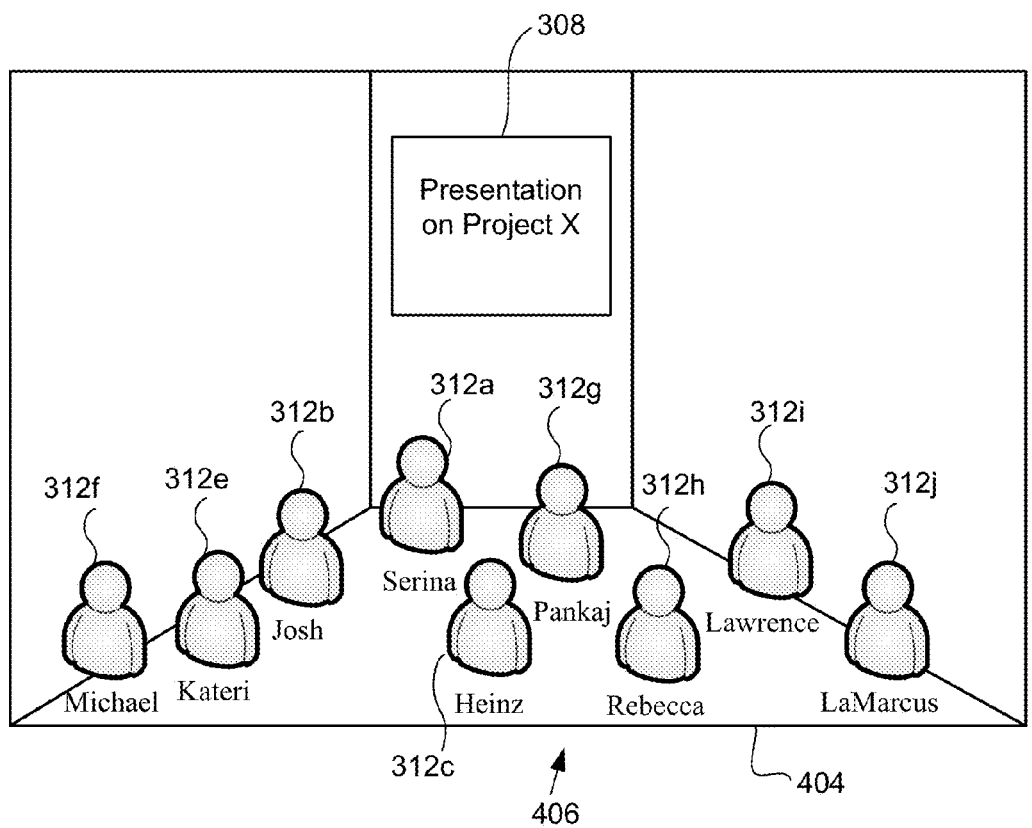
FIG. 4 depicts an integrated conference where an MCU conference is presented as multiple avatars in accordance with embodiments of the present disclosure.

FIGS. 3 and 4 depict views of a user interface 304, 404 in accordance with embodiments of the present disclosure. The user interface 304, 404 can be provided by or in connection with a user output device 224 (e.g., a display) of a communication device 104. The user interface 304, 404 can be generated through or in connection with the operation of the VR module 120 running on the VR server 112, and/or in connection with a companion application, such as a browser application 232 and/or a VRE client application 236, running on the communication device 104.

More particularly, the view of the user interface 304, 404 shows a presentation of a VRE 306, 406 generated by the VR module 120. In the VRE 306, 406 users 116 of communication devices 104 participating in a VR meeting are depicted as avatars 312. The avatars 312 can include avatars depicting users 116 associated with communication devices 104 that have registered with the VRE module 120 directly. For example, the first avatar 312a, the second avatar 312b, and the third avatar 312c may depict the first 116a, second 116b, and third 116c users associated with the first 104a, second 104b, and third 104c communication devices respectively. In addition, embodiments of the present disclosure allow users 116 who have registered with an MCU conference module 124a as part of a multipoint conference established through a conference server 114 to participate in the VRE 306, 406. For example, the fourth avatar 312d may be associated with all of the users 116e, 116f and more, which are registered with the MCU conference module 124. More particularly, the view of the user interface 404 shows a presentation of a VRE 406 generated by the VR module 120. In the VRE 406, each registered user 116 of communication device 104 participating in a VR meeting is depicted as a separate avatar 312.

Whether a user 116 is registered with the VRE module 120 directly, or through the MCU conference module 124, the experience of the VRE 306, 404 can be the same. Accordingly, the view of the VRE 306, 406 presented by the user interface 304, 404 can provide the same user experience to all participants. Accordingly, the VRE 306, 406 can operate such that audio and/or video information provided to the VRE is available to all users 116, provided the avatar 312 is located and/or controlled to receive that information. For example, where the first avatar 312a represents the presenter, the users 116 associated with the remaining avatars 312b-d, can see the presentation materials provided as the displayed information 308, as well as hear an audio stream comprising a narration from the presenter. The presenter's voice will be stereophonic for participants in the room. In addition, the avatars 312 can be controlled to access and/or provide information selectively. For instance, by placing the second 312b and third 312c avatars in close proximity to one another, the users 116 associated with those avatars can engage in a side bar conversation or exchange of information. Moreover, in the composite environment provided by the VRE 306, 406 of embodiments of the present disclosure, such control is provided and/or features are available to all users 116 participating in the VRE 306, 406.

FIG. 5 depicts an integrated conference user interface in accordance with embodiments of the present disclosure. The user interface 500 can be provided by or in connection with a user workstation 104a or a user device 104b-n. The user interface 500 can be generated through or in connection with the operation of the virtual reality module 120 running on the virtual reality server 112, and/or in connection with a companion application, such as a specially provided application and/or a browser application. Accordingly, the user interface 500 is generally presented to a user workstation/communication device 116a-f.

Generally the user interface allows one or more administrators of a conference to use either proprietary or standard conference event notification methods, as described in RFC 4575, where notifications are sent regarding changes in conference membership and may include information regarding the state of conference components.

A trust relationship between the conference server 114 and the VR server 112 can be preconfigured so no authentication is required. Optionally, the trust relationship may be dynamic, where an authentication request may be made through an application. Once the trust relationship is confirmed, the conference server 114 and the VR server are joined in the integrated conference. Administrators on the conference server 114 and the VR server 112 may be able to delegate authority to non-administrative conference attendees or to other administrators. Administrators may also be able to execute any normal conference functions, including mute, un-mute, record, etc.

Figure 6:
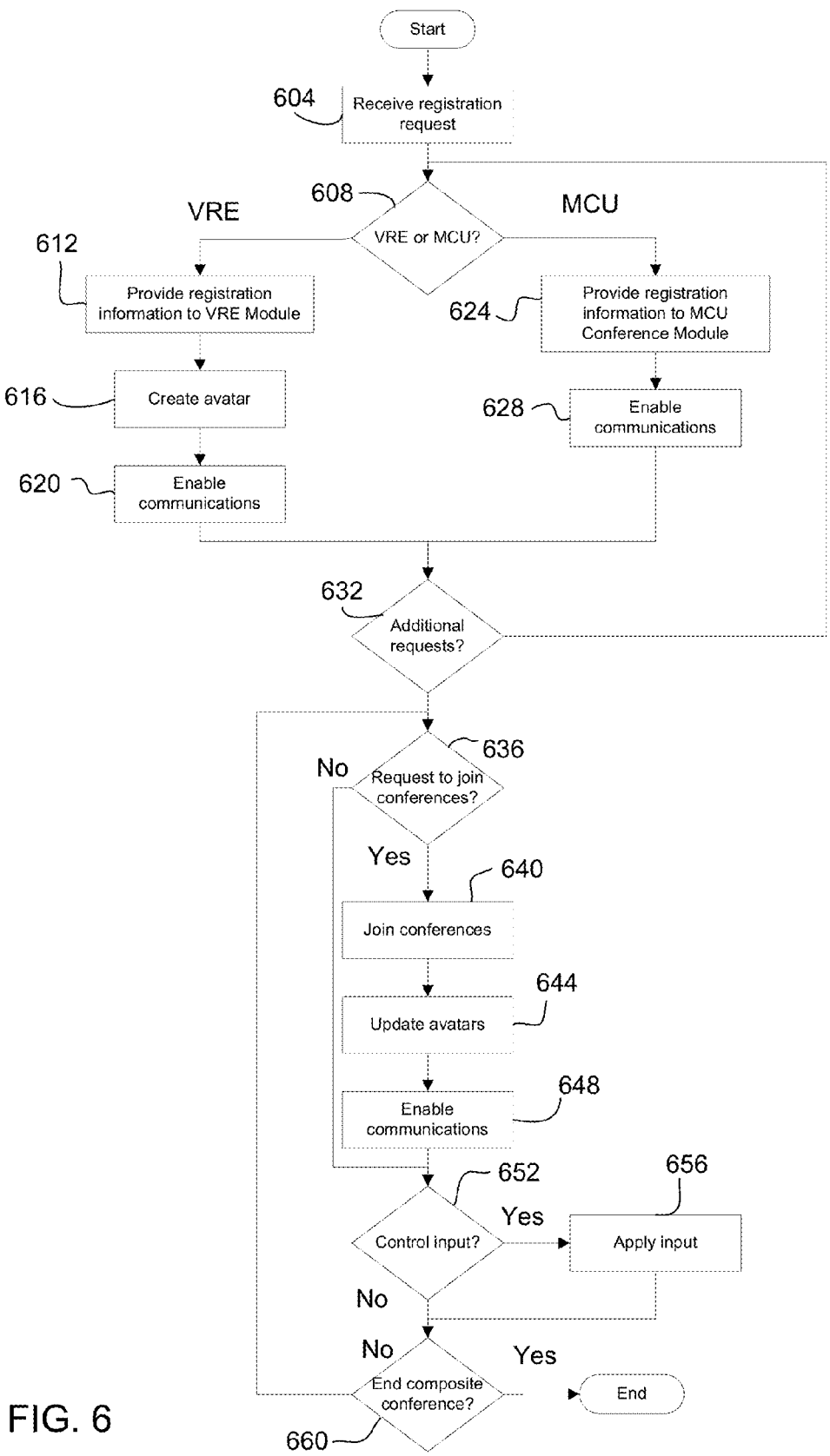
FIG. 6 is a flowchart depicting aspects of a method in accordance with embodiments of the present disclosure.

With reference now to FIG. 6, aspects of a method for providing a composite conference environment are depicted. Generally, the method begins with a registration request (step 604). At step 608, a determination is made as to whether the registration step is performed in connection with a VRE module 120, or an MCU conference module 124. If the registration is with respect to the VRE module 120, the process continues to providing registration information to the VRE module 120 (step 612). Providing registration information can include a user 116 associated with a communication device 104 entering information regarding the capabilities of the communication device 104, the address of the communication device 104, the identity of the user 116 and/or other information. Such information can also be pre-provisioned, provided by the user 116, or some combination thereof. Once the registration information has been obtained, an avatar 312 depicting the registered user 116 is displayed as part of a VRE 306 generated by the VRE module 120. Moreover, the VRE 306 is presented as part of a user interface 304 to the user 116 completing registration, and all previously registered users 116 (step 616). At step 620, the registered user can interact (e.g., communicate) with other registered users 116 within the VRE 306, or can wait until another user 116 registers.

If at step 608 the registration is directed to the MCU conference module 124, registration information is collected from or regarding the communication device 104 of a user 116 connected to a conference server 114 and is provided to the MCU conference module 124 (step 624). Registration can include providing information identifying the communication device 104 and/or associated user 116 to the MCU conference module 124. At step 628, the registered user 116 can be placed in communication with other registered users 116 participating in the conference established through the MCU conference module 124, or can be placed on hold until another communication device 104 or other endpoint is joined to the conference established by the MCU conference module 124.

At step 632, a determination can be made as to whether additional registration requests have been received. If additional requests are received, the process can return to step 608. In the absence of additional registration requests, or alternatively while continuing to process incoming registration requests, a determination can be made as to whether a request to join a conference established by the VRE module 120 to a conference established by the MCU conference module 124 has been received (step 636). If a request to join virtual and conventional conferences, and to thereby create a composite conference, has been received, the conventional conference is registered with the virtual reality conference (step 640).

Registering a conventional conference with a virtual reality conference can include placing the VRE module 120 in communication with the MCU conference module 124. More particularly, this can be accomplished by a user 116 or an administrator associated with the MCU conference module 124 directing the MCU conference module 124 to dial into or otherwise contact the VRE module 120. The MCU conference module 124 can then be established as a user on the VRE module 120. For example, the MCU conference module 124 registers as a user on the VRE module 120 when the MCU conference module 124 functions as a mixer that sends a mixed audio and video stream from users 116 registered with the MCU conference module 124. As another example, for instance where the MCU conference module 124 operates as a router that tunnels audio and video data from users 116 registered with the MCU conference module 124 to other participating users 116, the individual users 116 registered with the MCU conference module 124 can be individually registered with the VRE module 120, for example according to a roster of users 116 provided to the VRE module by the MCU conference module 124.

At step 644, the VRE 306 is updated to reflect the joining of users 116 to the VRE 306, creating a composite conference environment, by adding one or more avatars 312 representing such users 116 to the VRE 306. Where the MCU conference module 124 provides a mixed audio/video stream and was registered as a single user, a single avatar 312 can be added to the VRE 306. Where the MCU conference module 124 provides multiple audio/video streams and a roster of associated users 116, an avatar 312 can be added to the VRE 306 for each such user 116. The roster can also be displayed in the VRE 306, and communication between the users 116 represented by the avatars 312 in the VRE 306 can be enabled. In step 648, communications between associated users 116, avatars 312, the VR server 112, and the conference server 114 are established, based on the features available for the composite conference environment. At step 652, a determination can be made as to whether a control input has been received from a user 116 participating in the composite conference environment presented within the VRE 306 or from an administrator.

If a control input is received, it is applied across the composite conference environment, such that aspects of the conference experience with respect to all participating users 116 can be controlled, whether those users 116 are registered directly with the VRE module 120, or with the VRE module 120 through the MCU conference module 124 (step 656). At step 660, a determination can be made as to whether the conference has ended. If the conference has ended, for example through input by a single user 116 or administrator, the conference is torn down, and the process ends. Alternatively, the process can return to step 636, to determine whether a request to register from an additional user has been received.

In accordance with embodiments of the present disclosure, either the VR server 112 or the conference server 114 can operate as a master device. Moreover, communications between the servers 112 and 114, and the associated modules 120 and 124, can utilize standard and/or enhanced session initiation protocol (SIP) messages. Moreover, in creating a composite conference environment, the VRE module 120 and the MCU conference module 124 can present themselves to the other module as a video endpoint. Moreover, both the VR server 112 and the conference server 114 generally operate as conference factories, that each has one or more users 116 in their respective conferences. Whether the VR server 112 or the conference server 114 operates as the master in creating a composite conference environment can be administratively controlled or dynamic, based on configuration, number of participants, available resources, and the like. Moreover, embodiments can support integrated conference roster control, including adding or removing users, other floor control operations, such as mute, un-mute, and the ability to promote users to moderators, or other actions, that are applied across the composite conference environment. In addition to depicting the presence of the users 116 through avatars 312, displayed information 308 can be presented, for example in the form of VRE objects 316. VRE objects 316 presented as part of displayed information 308 can include presentations, whiteboards, documents, figures, videos, text, etc.

In an additional embodiment, video from the conference server 114 may be presented in a variety of ways in the VRE 306. For example, the video may be delivered as a pop-up window that all participants can see. Another example might be that when a cursor is moved over an avatar, the VR server renders the video on a screen or other flat surface (e.g., a wall).

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A method performed by a processor for presenting conference information, comprising:
   providing a virtual reality environment (VRE) module;
   registering a first user with the VRE module;
   registering a second user with the VRE module;
   using the VRE module, providing the first and second users with shared information;

providing a multipoint control unit (MCU) conference module;
registering a third user with the MCU conference module;
joining the first, second, and third users in a composite conference environment; and
determining whether the VRE module or the MCU conference module shall serve as the master of the composite conference environment based on at least one of an administrative determination or a dynamic consideration.

2. The method of claim 1, further comprising:
in the composite conference environment, displaying a roster of all the users participating in the composite conference environment.

3. The method of claim 2, further comprising:
creating, by the VRE, an avatar for each of the first, the second, and the third users.

4. The method of claim 3, further comprising:
registering a fourth user with the MCU conference module.

5. The method of claim 4, further comprising:
the MCU conference module providing a signal including at least one of an audio and a video stream from at least one of the third and fourth users to the VRE module as a mixed signal stream; and
representing the third and fourth users by the VRE module as a shared avatar.

6. The method of claim 4, further comprising:
the MCU conference module routing signals including at least one of an audio and a video stream from each of the third and fourth users to the VRE module as separate signal streams, and providing a roster identifying the third and fourth users to the VRE module; and
representing the third and fourth users by the VRE module as separate avatars.

7. The method of claim 4, wherein the MCU conference module operates as a video endpoint with respect to the composite conference environment.

8. The method of claim 7, wherein audio and video signals exchanged within the composite conference environment are provided from the VRE module to the MCU conference module.

9. The method of claim 8, wherein audio and video signals exchanged within the composite conference environment are determined by the VRE module.

10. The method of claim 9, further comprising:
receiving a first command input from one of the first, second, third, and fourth users;
applying a first operation in response to the first command input to at least some of the first, second, third, and fourth users.

11. A system, comprising:
a conference server, including:
    a communication interface;
    a first memory;
    a first processor;
    a multipoint control unit (MCU) conference module stored in the first memory and executed by the first processor;
a virtual reality (VR) server, including:
    a communication interface;
    a second memory;
    a second processor;
    a virtual reality (VR) module stored in the second memory and executed by the second processor, wherein the VR module is operable to register users in a virtual reality environment (VRE) maintained by the VR module directly, and wherein the VR module is further operable to register users participating in a multipoint conference maintained by the MCU conference module in the VRE maintained by the VR module, and wherein the VR module is operable to determine whether the VR module or the MCU conference module shall serve as the master of the VRE based on at least one of an administrative determination or a dynamic consideration.

12. The system of claim 11, wherein the users participating in the multipoint conference are represented in the VRE as a single avatar.

13. The system of claim 12, wherein the users participating in the multipoint conference are each represented in the VRE as their own avatar.

14. The system of claim 11, wherein the VR module registers the multipoint conference as a user in the VRE.

15. The system of claim 14, wherein the VRE environment provides a visual depiction including avatars for users registered in the VRE directly and at least a first avatar for users registered in the VRE through the MCU conference.

16. The system of claim 15, further comprising:
a plurality of endpoints, wherein a first set of the plurality of endpoints includes one or more endpoints registered and in communication with the VR module, wherein a second set of the plurality of endpoints includes one or more endpoints registered and in communication with the MCU conference module, wherein audio and video streams are exchanged between all of the endpoints through operation of at least the VR module.

17. A non-transitory computer readable medium having stored thereon computer executable instructions, the non-transitory computer executable instructions causing a processor to execute a method for providing a composite conference environment through a virtual reality (VR) module, the non-transitory computer executable instructions comprising:
instructions to create at least a first avatar to represent at least a first user registered with the VR module in a virtual reality environment (VRE);
instructions to receive an advertisement by a multipoint control unit (MCU) that the MCU has video endpoint capabilities;
instructions to create at least a second avatar to represent at least one of the MCU and a second user registered with the MCU in the VRE;
instructions to provide a video representation of the VRE that includes the first and second avatars to the first and second users; and
instructions to determine whether the VR module or the MCU conference module shall serve as the master of the composite conference environment based on at least one of an administrative determination or a dynamic consideration.

18. The non-transitory computer readable medium of claim 17, wherein the advertisement by the MCU is provided as a session initiation protocol (SIP) message.

19. The non-transitory computer readable medium of claim 18, wherein the MCU provides a roster including at least the second user and a third user to the VR module, wherein the second user is represented by the second avatar, and wherein the third user is represented by a third avatar.

20. The non-transitory computer readable medium of claim 19, wherein the contents of an audio/video stream provided to the users is determined by the relationship of avatars representing the users to a representation of a source of audio/video information included in the audio/video stream.

* * * * *